United States Patent
Bicker

(10) Patent No.: US 7,511,215 B2
(45) Date of Patent: Mar. 31, 2009

(54) VOIP MUSIC CONFERENCING SYSTEM

(75) Inventor: Dennis Dale Bicker, San Ramon, CA (US)

(73) Assignee: AT&T Intellectual Property L.L.P., Reno, NV (US)

( * ) Notice: Subject to any disclaimer, the term of this patent is extended or adjusted under 35 U.S.C. 154(b) by 422 days.

(21) Appl. No.: 11/153,853

(22) Filed: Jun. 15, 2005

(65) Prior Publication Data

US 2006/0283310 A1    Dec. 21, 2006

(51) Int. Cl.
*G10H 7/00*    (2006.01)

(52) U.S. Cl. .............................. 84/645; 84/600; 84/610; 84/622; 84/634

(58) Field of Classification Search ........................ None
See application file for complete search history.

(56) References Cited

U.S. PATENT DOCUMENTS

| | | | |
|---|---|---|---|
| 6,801,521 B1 * | 10/2004 | Shaffer et al. ............... | 370/352 |
| 7,020,635 B2 * | 3/2006 | Hamilton et al. ............... | 705/51 |
| 7,030,311 B2 * | 4/2006 | Brinkman et al. .............. | 84/625 |
| 2004/0151212 A1 * | 8/2004 | Gerszberg et al. ........... | 370/535 |
| 2005/0027888 A1 * | 2/2005 | Juszkiewicz ................. | 709/250 |
| 2007/0006255 A1 * | 1/2007 | Cain ........................... | 725/36 |

\* cited by examiner

*Primary Examiner*—Marlon T Fletcher
(74) *Attorney, Agent, or Firm*—Toler Law Group

(57) ABSTRACT

A client device comprises a plurality of audio input ports, at least one audio output port, a MIDI input port, a MIDI output port, a video input port, a video output port, a processor and a network interface. The processor generates outgoing IP messages that carry at least one audio input signal received from the audio input ports, a first MIDI signal received from the MIDI input port and a first video signal received from the video input port. From incoming IP messages, the processor extracts a second MIDI signal for the MIDI output port, a second video signal for the video output port, and at least one audio output signal for the at least one audio output port. A network interface sends the outgoing IP messages within a VoIP call via a network and receives the incoming IP messages within the VoIP call via the network.

11 Claims, 1 Drawing Sheet

VOIP MUSIC CONFERENCING SYSTEM

FIELD OF THE DISCLOSURE

The present disclosure relates to systems for remotely-located musicians to perform together.

BACKGROUND

Groups of musicians who wish to perform together typically assemble in a common location such as a performance venue, a rehearsal studio, a recording studio or a person's home. At times, it is a challenge to assemble all of the members of a music group at the same place and time in order to perform together.

Accordingly, there is a need for a system to facilitate musician interaction.

DETAILD DESCRIPTION OF THE DRAWINGS

Figure 1:
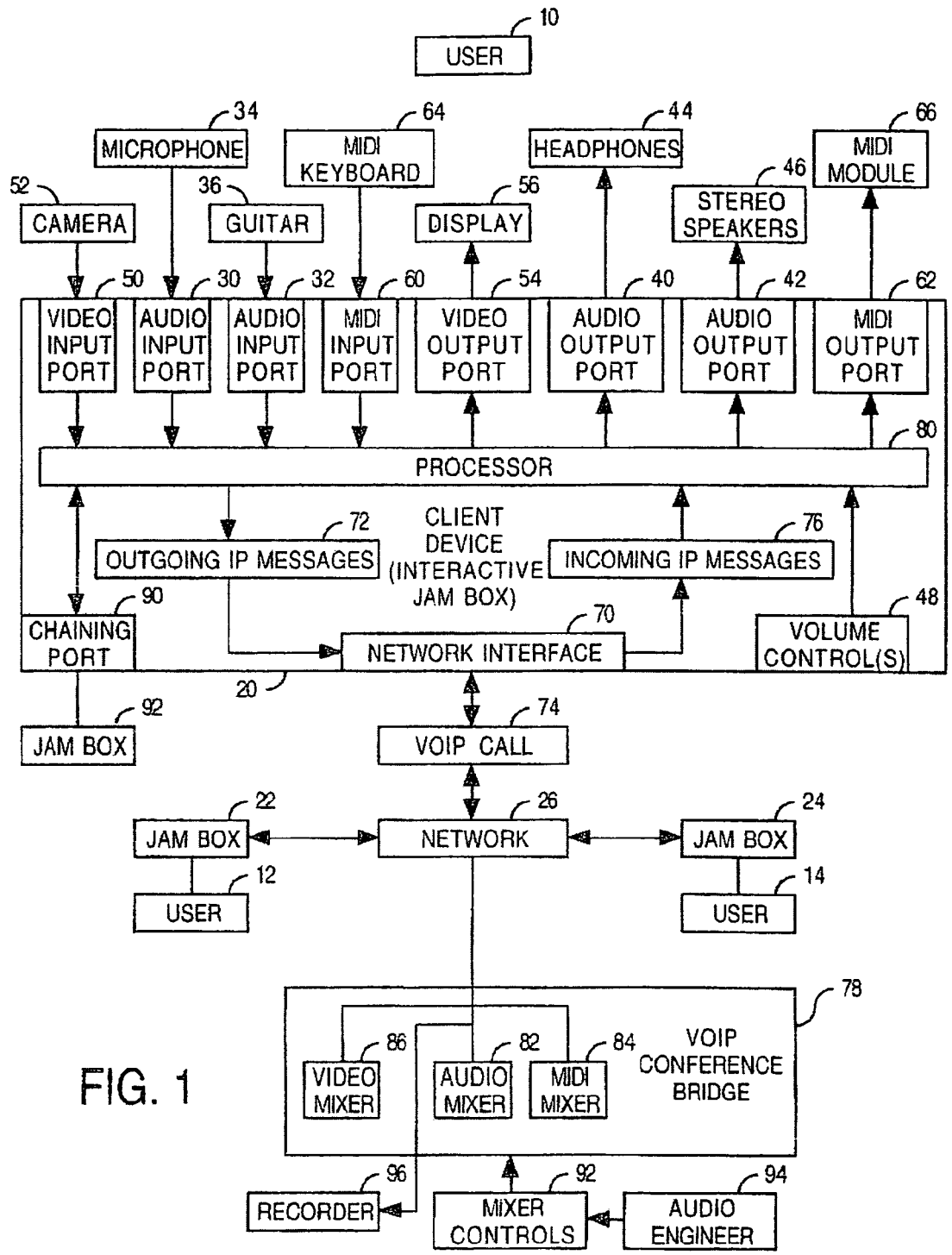
FIG. 1 is a flow chart of an embodiment of a VoIP music conferencing system.

Disclosed herein are embodiments of a Voice over Internet Protocol (VoIP) music conferencing system that enables physically-distant musicians to see and hear each other in a group performance, and enables an audio engineer to mix and/or record the audio of the group performance at a VoIP phone bridge.

FIG. 1 is a block diagram of an embodiment of a VoIP music conferencing system. For purposes of illustration and example, FIG. 1 shows the VoIP music conferencing system being used to enable three users 10, 12 and 14 at three different locations to perform music together. In general, the VoIP music conferencing system can be used to enable more or less than three different users at more or less than three different locations to perform music together.

The VoIP music conferencing system comprises client devices 20, 22 and 24 for the users 10, 12 and 14, respectively. Each of the client devices 20, 22 and 24 may be referred to as an "interactive jam box" because they allow the users 10, 12 and 14 to interactively perform music together (or "jam") via a network 26. Each of the client devices 20, 22 and 24 may be embodied by either a general purpose computer, a set-top box, a VoIP telephone, or a peripheral of any of these. Examples of the network 26 include Internet Protocol (IP) networks such as an IP Television (IP TV) network, a VoIP network, the Internet, an intranet or an extranet.

The client device 20 comprises multiple audio input ports 30 and 32 to receive audio signals generated by the user 10. The audio input ports 30 and 32 provide connections to receive audio signals from external devices such as a microphone 34, an instrument having a microphone-level output such as a guitar 36, and an audio playback device (not illustrated) which may have either a microphone-level or a line-level output such as a CD player, a tape player, a DVD player, an MP3 player or another digital audio player. The microphone 34 may be used to capture vocals produced by the user 10 and/or to capture sound produced by acoustic instrument(s) played by the user 10. The audio input ports 30 and 32 may include RCA input jacks, ⅛ inch or ¼ inch jacks (either mono or stereo), or any combination thereof, for example. In general, the client device 20 may comprise more than the two audio input ports shown in FIG. 1.

The client device 20 further comprises multiple audio output ports 40 and 42. The audio output ports 40 and 42 provide connections to output audio signals to external devices such as headphones 44, stereo speakers 46, and an audio recording device (not illustrated) such as a tape recorder, a CD recorder, a DVD recorder, an MP3 recorder or another digital audio recorder. The audio output ports 40 and 42 may include RCA output jacks, ⅛ inch or ¼ inch jacks (either mono or stereo), or any combination thereof. In general, the client device 20 may comprise more than the two audio output ports shown in FIG. 1. One or more volume controls 48 enable the user 10 to control the volume of audio signals applied to the multiple audio output ports 40 and 42.

The client device 20 further comprises a video input port 50. The video input port 50 provides an input connection to receive video signals from an external video-generating device such as a video camera 52. The video camera 52 may capture moving images of the user 10 during his/her performance. The video input port 50 may comprise either a Universal Serial Bus (USB) port or an RCA jack, for example. In general, the client device 20 may comprise more than the one video input port shown in FIG. 1.

The client device 20 further comprises a video output port 54. The video output port 54 provides an output connection to output video signals to an external video display device 56. The video output port 54 may comprise either a video monitor port, an RCA jack, or a coaxial cable jack, for example. The video display device 56 may comprise a computer monitor or a television, for example.

The client device 20 further comprises a Musical Instrument Digital Interface (MIDI) input port 60 and a MIDI output port 62. The MIDI input port 60 provides an input connection to receive MIDI signals from an external device such as a MIDI keyboard 64 or an alternative MIDI controller (e.g. a MIDI sequencer, a pitch-to-MIDI device, one or more MIDI percussion pads, a MIDI drum machine, MIDI pedals or a MIDI wind instrument). The MIDI output port 62 provides an output connection to output MIDI signals to an external device such as a MIDI sound module 66 or a MIDI recorder (not illustrated). The MIDI sound module 66 outputs synthesized or sampled audio based on the MIDI signals outputted from the MIDI output port 62. The MIDI recorder (not illustrated) records the MIDI signals outputted from the MIDI output port 62 into a MIDI song file.

The client device 20 comprises a network interface 70. The network interface 70 enables the client device 20 to be connected to the network 26. The network interface 70 sends outgoing IP messages 72 within a VoIP call 74 via the network 26. The network interface 70 further receives incoming IP messages 76 within the VoIP call 74 via the network 26. The VoIP call 74 is made to a VoIP conference bridge 78 having a connection to the network 26. The VoIP conference bridge 78 can accept multiple simultaneous VoIP calls, including the VoIP call 74, and can bridge the client devices 20, 22 and 24 of the users 10, 12 and 14 via the multiple simultaneous VoIP calls. The VoIP conference bridge 78 can either automatically assign ports to inbound VoIP calls, or allow each caller to request a port number by keying the number, or assign ports based on a caller's telephone number.

A VoIP processor 80 generates the outgoing IP messages 72 to carry any combination of at least one audio input signal received from the audio input ports 30 and 32, a first MIDI signal received from the MIDI input port 60 and a first video signal received from the video input port 50. From the incoming IP messages 76, the VoIP processor 80 extracts any combination of a second MIDI signal to apply to the MIDI output port 62, a second video signal to apply to the video output port 54, and at least one audio output signal to apply to the audio output port(s) 40 and/or 42.

The audio input ports 30 and 32 and the VoIP processor 80 can support, with one associated dialing sequence, multiple simultaneous VoIP channels that are independently mixable. The multiple audio output ports 40 and 42 can support multiple simultaneous VoIP channels that were independently mixed.

The client devices 22 and 24 have substantially the same components and/or functionality as the client device 20 to process music performances of the users 12 and 14 and generate outgoing IP messages based thereon, and to receive incoming IP messages and generate outputs based thereon that enable interaction with other users. The VoIP conference bridge 78 receives the outgoing IP messages generated by the client devices 20, 22 and 24.

In one embodiment, the VoIP conference bridge 78 includes an audio mixer 82, a MIDI mixer 84 and a video mixer 86. The audio mixer 82 mixes the audio input signals carried by the outgoing IP messages generated by the client devices 20, 22 and 24, to generate a mixed audio signal. The video mixer 86 mixes the video input signals carried by the outgoing IP messages generated by the client devices 20, 22 and 24 to generate a mixed video signal. The MIDI mixer mixes the MIDI input signals carried by the outgoing IP messages generated by the client devices 20, 22 and 24 to generate a mixed MIDI signal. The VoIP conference bridge 78 generates IP messages to carry the mixed audio signal, the mixed video signal and the mixed MIDI signal. The IP messages are communicated via the network 26 and become the incoming IP messages to the client devices 20, 22 and 24. This enables the mixed audio signal to be heard using the headphones 44 and/or the stereo speakers 46, the mixed MIDI signal to be played using the MIDI sound module 66, and the mixed video signal to be displayed by the display device 56.

The client device 20 optionally comprises a through-network chaining port 90. The chaining port 90 enables the client device 20 to be chained to another client device 92. The client device 92 may have substantially the same components and/or functionality as the client device 20. Using the chaining port 90, a chain of two or more client devices can be formed to expand the number of input and output ports supported at a particular location.

In practice, any of the users 10, 12 and 14 can plug any combination of his/her headphones, a microphone, an instrument's microphone output, and a MIDI device, for example, into his/her client device. Each user uses his/her client device to call into a VoIP conference. After joining the VoIP conference, each user can jam with other users on the call. Each of the users 10, 12 and 14 can hear a mix of audio simultaneously performed by the users 10, 12 and 14. Optionally, the mix of performance audio can be outputted through an amplifier and speakers for a larger audience. As another option, a user can make an audio recording of the session via an audio output port of his/her client device. With the video camera 52 and the display 56, the user 10 can see and be seen by other performers on the call. This enables visual cues to be communicated between performers during a performance. Visual cues are important during improvisational performances, large-scale performances (e.g. by a symphony), rehearsals and musical instruction (e.g. by a music teacher). Optionally, the video mixer 86 can mix multiple video signals so that a conductor is shown in the middle of the display 56 surrounded by pictures of group members. The conductor may be displayed larger than each of the group members. The MIDI input and output enable the user to capture MIDI files to be edited and played back later.

The VoIP music conferencing system enables a music teacher to remotely give lessons to a student at potentially any location on Earth. Small or large bands can have jam sessions at any time of day or night with minimal disturbance to those around them and without needing to physically congregate. Choirs, quartets and symphony orchestras can practice and perform in a virtual hall. The size of the group may be limited only by the capacity of the conference bridge 78. Potentially, thousands of members can perform together, which is a larger number than previously practical. The system makes it easier to create a "We are the World"-type concert or recording.

Optionally, the VoIP conference bridge 78 includes mixer controls 92 to enable an audio engineer 94 or another person to independently control mixing levels of each of the audio signals inputted to the audio mixer 82. This allows the audio engineer 94 to control the mixed audio signal being distributed to the users 10, 12 and 14. The audio mixer 82 and/or the mixer controls 92 may be either integrated with the conference bridge 78 or externally connected to the conference bridge 78. The VoIP conference bridge 78 with a user-controlled mixing capability may be referred to as an "interactive mix box."

A recorder 96 can record, to either a digital or an analog medium, some or all of the separate channels of audio (and/or the mixed audio). For a digital medium, the recorded data can be made available via a digital interface such as a USB interface or a FireWire interface. The recorder 96 can comprise a multi-track audio recorder to record each respective audio signal received in the plurality of simultaneous VoIP calls on a separate track. Along with the separate channels of audio, the recorder 96 can record separate channels of MIDI and/or separate channels of video. The recordings of the separate channels can be later re-mixed by the audio engineer 94 or another person.

In combination with the client devices 20, 22 and 24, the VoIP conference bridge 78 enables audio engineers to create a mix with appropriate sound levels for a virtual musical group such as a vocalist/accompanist duo, a small band, a large band, a quartet, a choir or an orchestra. When fixed ports and input levels are used, preset audio levels on the audio mixer 82 can simplify the job of the audio engineer 94.

Acts performed by the VoIP processor 80 can be performed by one or more computer processors directed by computer-readable program code stored by a computer-readable medium.

Each of the client devices 20, 22 and 24 can be either integrated with or a peripheral of a set-top box for an IP television service. Alternatively, each of the client devices 20, 22 and 24 can be either integrated with or a peripheral of a VoIP telephone for a VoIP telephone service. As another alternative, each of the client devices 20, 22 and 24 can be either integrated with or a peripheral of a general purpose computer used in an Internet service.

It will be apparent to those skilled in the art that the disclosed embodiments may be modified in numerous ways and may assume many embodiments other than the particular forms specifically set out and described herein. The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a plurality of audio input ports;
   at least one audio output port;
   a musical interface digital. interface (MDI) input port;
   a MIDI output port;
   a video input port;
   a video output port;
   a processor to generate outgoing Internet Protocol (IP) messages that carry at least one audio input signal received from one of the plurality of audio input ports, a first MIDI signal received from the MIDI input port and a first video signal received from the video input port;
   the processor to extract from incoming IP messages a second MIDI signal for the MIDI output port, a second video signal for the video output port, and at least one audio output signal for the at least one audio output port; and
   a network interface to send the outgoing IP messages within a Voice over Internet Protocol (VoIP) call via a network and to receive the incoming IP messages within the VoIP call via the network, wherein the second MIDI signal is in the incoming IP messages when received by the network interface.

2. The system of claim 1 wherein the audio input ports and the processor support multiple simultaneous VoIP channels connected with one dialing sequence.

3. The system of claim 2, wherein the multiple simultaneous VoIP channels are independently mixable.

4. The system of claim 1, wherein the at least one audio output port comprises a plurality of audio output ports that support multiple simultaneous VoIP channels that were independently mixed.

5. The system of claim 1, further comprising a MIDI mixer to mix the first MIDI) signal with at least one other MIDI signal to generate a mixed MIDI signal, and to communicate IP messages that carry the mixed MIDI signal.

6. The system of claim 1, further comprising a video mixer to mix the first video signal with at least one other video signal to generate a mixed video signal, and to communicate IP messages that carry the mixed video signal.

7. The system of claim 1, further comprising a through-network chaining port in communication with the processor.

8. The system of claim 1, wherein the plurality of audio input ports, the at least one audio output port, the MIDI input port, the MIDI output port, the video input port, the video output port, the processor and the network interface are integrated within a set-top box for an IP television service.

9. The system of claim 1, further comprising:
   a VoIP conference bridge to accept a plurality of simultaneous VoIP calls, including the VoIP call, and to receive within each of the simultaneous VoIP calls respective TIP messages carrying a respective audio signal; and
   a multi-track audio recorder to record each respective audio signal received within the plurality of simultaneous VoIP calls on a separate track.

10. A system comprising:
    a VoIP conference bridge to accept a plurality of simultaneous VoIP calls, including a VoIP call, and to receive within each of the simultaneous VoIP calls respective IP messages carrying a respective audio signal, the VoIP conference bridge comprising a mixer control for a user to control a respective mixing level of each respective audio signal, the VoIP conference bridge comprising an audio mixer to mix the respective audio signals based on the mixer control to generate a mixed audio signal, the VoIP conference bridge to send IP messages to carry the mixed audio signal within the simultaneous VoIP calls; and
    a MIDI mixer to mix a first MIDI signal with at least one other MIDI signal to generate a mixed MIDI signal, and to communicate IP messages that carry the mixed MIDI signal.

11. A system comprising:
    a VoIP conference bridge to accept a plurality of simultaneous VoIP calls, including a VoIP call, and to receive within each of the simultaneous VoIP calls respective IP messages carrying a respective audio signal, the VoIP conference bridge comprising a mixer control for a user to control a respective mixing level of each respective audio signal, the VoIP conference bridge comprising an audio mixer to mix the respective audio signals based on the mixer control to generate a mixed audio signal, the VoIP conference bridge to send IP messages to carry the mixed audio signal within the simultaneous VoIP calls;
    a MIDI mixer to mix a first MIDI signal with at least one other MIDI signal to generate a mixed MIDI signal, and to communicate IP messages that carry the mixed MIDI signal; and
    a video mixer to mix a first video signal with at least one other video signal to generate a mixed video signal, and to communicate IP messages that carry the mixed video signal.

* * * * *